(12) United States Patent
Kilmartin

(10) Patent No.: US 7,752,185 B1
(45) Date of Patent: Jul. 6, 2010

(54) SYSTEM AND METHOD TO PERFORM DATA INDEXING IN A TRANSACTION PROCESSING ENVIRONMENT

(75) Inventor: Paul Kilmartin, San Jose, CA (US)

(73) Assignee: eBay Inc., San Jose, CA (US)

( * ) Notice: Subject to any disclaimer, the term of this patent is extended or adjusted under 35 U.S.C. 154(b) by 546 days.

(21) Appl. No.: 10/452,215

(22) Filed: May 30, 2003

Related U.S. Application Data

(60) Provisional application No. 60/384,588, filed on May 31, 2002.

(51) Int. Cl.
*G06F 7/00* (2006.01)
(52) U.S. Cl. ............... 707/705; 707/609; 707/736; 707/741
(58) Field of Classification Search ............ 705/26, 705/27; 707/201, 204, 104, 1, 100, 999.001, 707/999.002, 999.003, 999.1, 999.2
See application file for complete search history.

(56) References Cited

U.S. PATENT DOCUMENTS

| 5,758,356 | A | * | 5/1998 | Hara et al. ............. 707/202 |
| 5,974,409 | A | * | 10/1999 | Sanu et al. ............. 707/3 |
| 6,856,970 | B1 | * | 2/2005 | Campbell et al. ......... 705/35 |
| 6,976,039 | B2 | * | 12/2005 | Chefalas et al. ......... 707/204 |
| 7,373,314 | B2 | * | 5/2008 | Aliabadi et al. ......... 705/26 |
| 2001/0027420 | A1 | * | 10/2001 | Boublik et al. ......... 705/26 |
| 2004/0193503 | A1 | * | 9/2004 | Eder ................... 705/26 |
| 2004/0215670 | A1 | * | 10/2004 | Holenstein et al. ..... 707/201 |
| 2005/0203765 | A1 | * | 9/2005 | Maritzen et al. ........ 705/1 |

* cited by examiner

*Primary Examiner*—Hung Q Pham
(74) *Attorney, Agent, or Firm*—Schwegman, Lundberg & Woessner, P.A.

(57) ABSTRACT

A system and method to perform data indexing in a transaction processing environment are described. Data is periodically extracted from one or more database servers storing the data. A database stored in a storage device is then updated with the extracted data to obtain an updated database. Finally, the updated database is transmitted to one or more search servers.

14 Claims, 7 Drawing Sheets

SYSTEM AND METHOD TO PERFORM DATA INDEXING IN A TRANSACTION PROCESSING ENVIRONMENT

CROSS-REFERENCE TO RELATED APPLICATION

The present application claims the benefit of the filing date of U.S. provisional application Ser. No. 60/384,588, filed May 31, 2002.

FIELD OF THE INVENTION

This invention relates generally to the field of network-based communications and, more specifically, to a system and method to perform data indexing in a transaction processing environment.

BACKGROUND

The explosive growth of the Internet and its subset, the World Wide Web, as a publication and interactive communication platform has created an electronic environment that is changing the way business is transacted. To enable users to navigate this unprecedented volume of information, a number of so-called "search engine" technologies have been developed and deployed under various brands, for example, search engine technologies developed by Inktomi, Inc., and Google Incorporated.

Search engine technology is also widely deployed within the context of websites, so as to allow visitors to a particular website to locate documents or features that may be of interest. For example, a large number of corporate websites operating as major communication channels to customers typically employ search engine technology to allow a user, for example, to locate specific technical documents and articles pertaining to specific products.

The use of search engine technology is also widely evident in Internet-based electronic marketplaces or exchanges. Currently, such marketplaces are classified as being business-to-consumer (B2C), consumer-to-consumer (C2C), or business-to-business (B2B), according to the types of parties among which transactions are facilitated. In the context of a B2B exchange, a potential purchaser for a particular company may, via the online exchange, conduct a search of the inventories of suppliers, these inventories having been published by the relevant suppliers to the online exchange. Similarly, in the B2C and C2C environments, a potential purchaser is enabled to search product offerings utilizing the search engine technology supplied by the relevant marketplace. One form of an electronic marketplace that has proven to be popular is the consumer-oriented online auction marketplace, where suppliers publish product or service offerings to be sold via an auction process.

The value of a search engine technology within the context of such online marketplaces is particularly evident when one considers the number of items, be it products or services, which are being offered by suppliers via such marketplaces. In order to bring a degree of automation to the searching of such vast and ever-dynamic inventory available for purchase on an online marketplace, a number of such online marketplaces offer automated search features. Such automated search features typically allow a user to define search terms and conditions in a search request. Subsequently, at scheduled times, the online marketplace will automatically conduct a search utilizing the terms and conditions, and automatically communicate the results of the searches to the relevant user.

One distinguishing characteristic of user search requests is whether the request requires real-time data interaction. For typical searching conducted over the Internet, for example searching of a corporate website to locate specific technical documents and articles pertaining to specific products, periodic updates to a database containing the items to be searched are sufficient to permit search engines to meet the performance expectations of most users. The currency of data used in such searching is not crucial because users are seeking data that either remains static upon creation or is not used in critical transactions.

For real-time, data-critical transactions, conventional systems may have to sacrifice speed in order to ensure currency of data and accurate transactions. For example, online banking and travel reservation systems require that the contents of their databases be both accurate and current and, therefore, often suffer from traffic-based performance degradation. Furthermore, if searching traffic is high, such online transaction processing systems experience periodically degraded performance or even a halt of the system performance altogether.

In the case of online electronic marketplaces and/or exchanges, the set of challenges is particularly demanding. Online marketplaces must enable currency of data and accuracy of transactions, while at the same time providing highly flexible searching for a large number of users. This flexibility requirement is fulfilled if each entry is comprehensively indexed. However, data indexing is difficult and time-consuming to set up, as well as processing intensive each time a search is performed.

In addition, online marketplaces must also enable users to rapidly transition from "shopping mode" to "purchasing mode." Online buyers typically view many more items than they purchase. Once a potential buyer makes a purchasing decision, however, the online marketplace must enable the buyer to immediately interact with real-time data to complete the transaction. Any delay may result in reconsideration and/or retraction of the purchasing decision.

As a result, there is a need in the online marketplace environment for a system for conducting high-performance online transaction processing. The system must provide a large number of users with the flexibility of a fully indexed data set as well as currency of data and accuracy of online transactions.

SUMMARY

A method for indexing data in a transaction processing environment. The method includes periodically extracting data from at least one database server; updating a database stored in a storage device with said data to obtain an updated database; and transmitting said updated database to at least one search server.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method to perform data indexing in a transaction processing environment are described.

As will be described in more detail below, data is periodically extracted from one or more database servers storing the data. A database stored in a storage device is then updated with the extracted data to obtain an updated database. Finally, the updated database is transmitted to one or more search servers.

An intended advantage of the embodiments described herein is a capacity to offload the serving of search requests from a database containing the items to be searched. Another intended advantage is a reduction of the load on a database of record. Another intended advantage is an improved currency of the data searched by one or more search servers. Yet another intended advantage relates to enhanced disaster resiliency by maintaining multiple copies of data in various formats.

Figure 1:
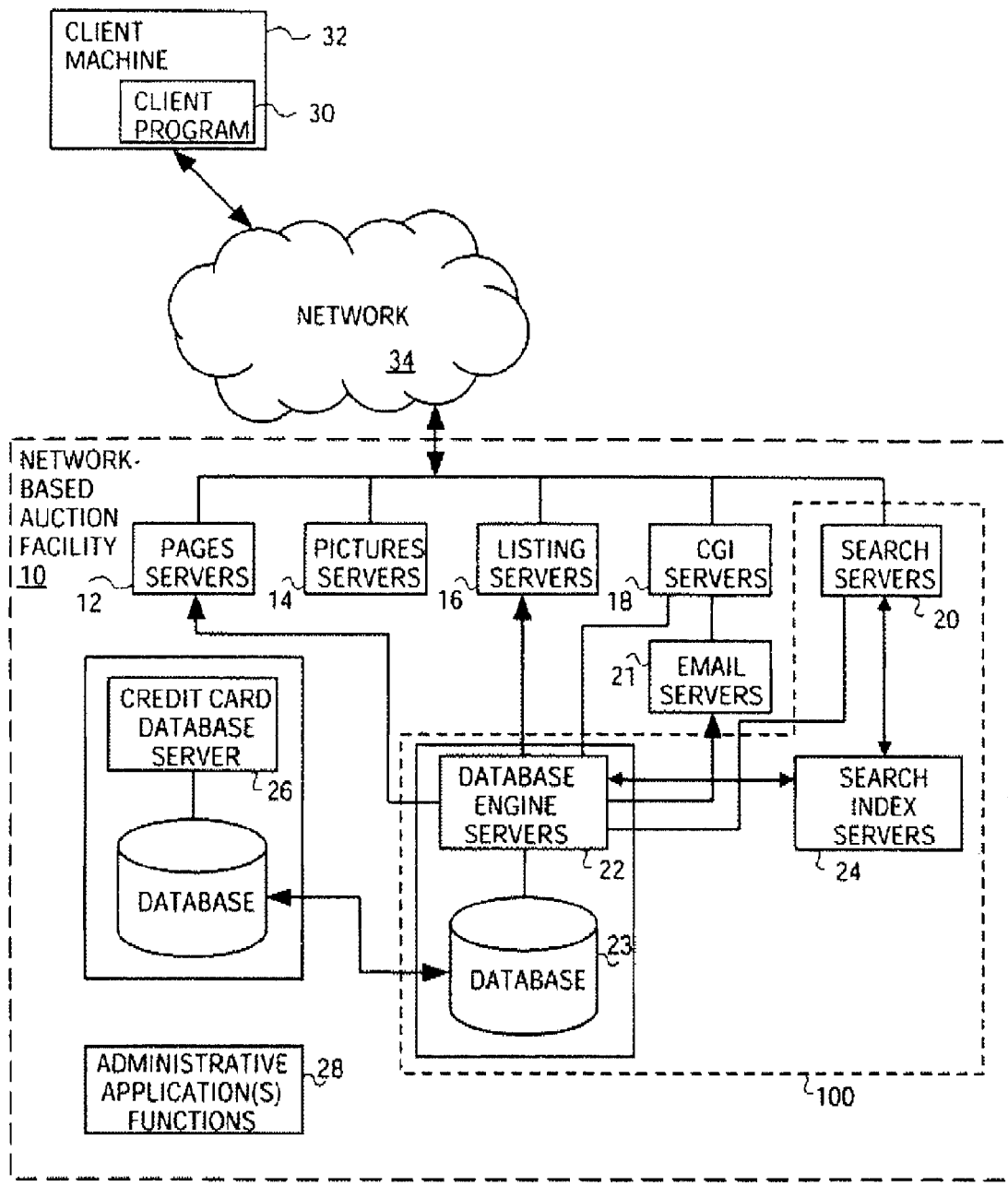
FIG. 1 is a block diagram illustrating an exemplary network-based transaction facility in the form of an Internet-based auction facility.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely communications servers in the exemplary form of page servers 12 that deliver web pages to multiple entities (e.g., markup language documents), picture servers 14 that dynamically deliver images to be displayed within the web pages, listing servers 16, processing servers in the exemplary form of Common Gateway Interface (CGI) or Internet Server Application Program Interface (ISAPI) servers 18 that provide an intelligent interface to the back-end of the auction facility 10, and search servers 20 that handle search requests to the auction facility 10. In addition, the auction facility 10 includes e-mail servers 21 that provide, inter alia, automated e-mail communications to/from entities of the facility 10.

The auction facility 10 further includes one or more back-end servers, for example one or more database engine servers 22, one or more search index servers 24, and a credit card database server 26, each of which maintains and facilitates access to one or to multiple respective databases 23. The network-based auction facility 10, such as an Internet-based auction facility 10, may be accessed by a client program 30, such as a browser (e.g., the Internet Explorer browser distributed by Microsoft Corporation of Redmond, Wash.) that executes on a client machine 32 and accesses the facility 10 via a network 34, such as, for example, the Internet. Other examples of networks that a client may utilize to access the auction facility 10 includes a wide area network (WAN), a local area network (LAN), a wireless network (e.g., a cellular network), the Plain Old Telephone Service (POTS) network, or other distributed computing environment. The search servers 20, the database engine servers 22, and the search index servers 24 form a system 100 to perform data indexing according to embodiments of the present invention that will be described in further detail below.

Figure 2:
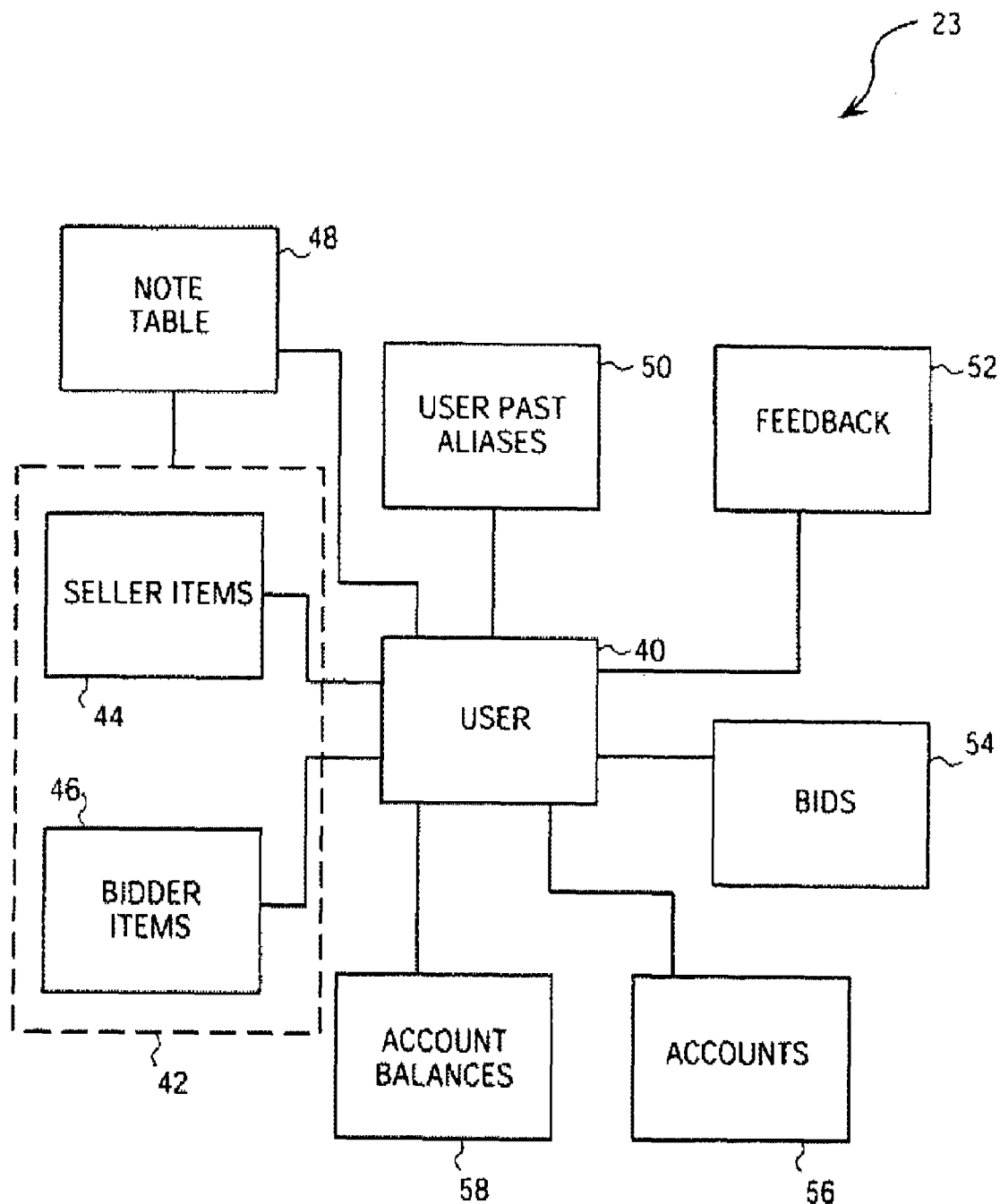
FIG. 2 is a block diagram illustrating an exemplary database, maintained by and accessed via a database engine server.

FIG. 2 is a block diagram illustrating an exemplary database 23, maintained by and accessed via the database engine servers 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

Central to the database 23 shown in FIG. 2 is a user table 40, which contains a record for each entity or user of the auction facility 10. Each user may operate as a seller, a buyer, or both, within the auction facility 10. The database 23 also includes items tables 42 that may be linked to the user table 40. Specifically, the table 42 includes a seller items table 44 and a bidder items table 46. A user record in the user table 40 may be linked to multiple items that are being, or have been, auctioned via the auction facility 10. A link indicates whether the user is a seller or a bidder (or buyer) with respect to items for which records exist within the items table 42.

The database 23 further includes a note table 48 populated with note records that may be linked to one or more item records within the items table 42 and/or to one or more user records within the user table 40. Each note record within the note table 48 may include, inter alia, a comment, description, history, or other information pertaining to an item being auctioned via the auction facility 10, or pertaining to a user of the auction facility 10.

A number of other tables are also shown to be linked to the user table 40, such as a user past aliases table 50, a feedback table 52, a bids table 54, an accounts table 56, and an account balances table 58.

Figure 3:
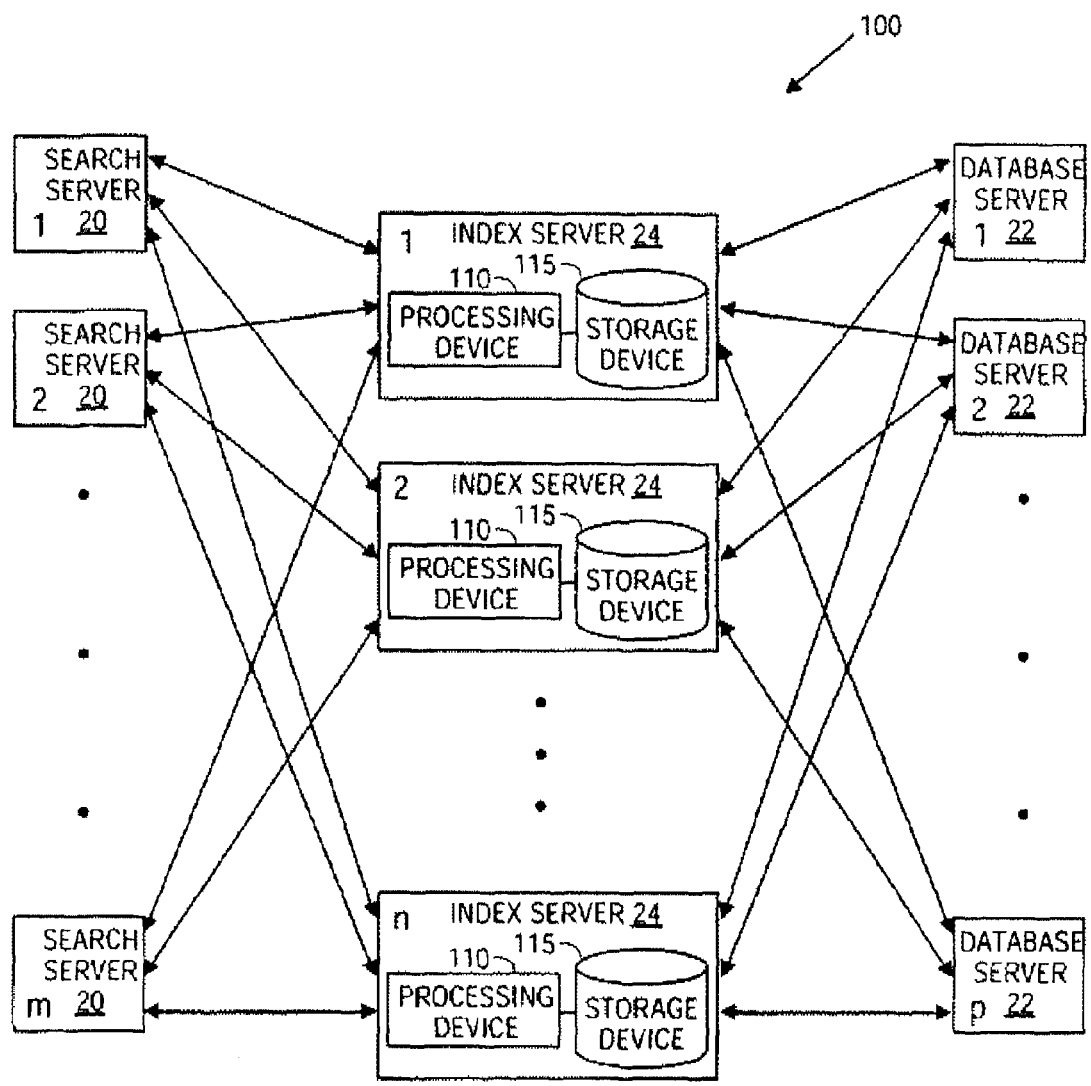
FIG. 3 is a block diagram illustrating one embodiment of a system to perform data indexing within the Internet-based auction facility.

FIG. 3 is a block diagram illustrating one embodiment of a system 100 to perform data indexing within the Internet-based auction facility. As illustrated in FIG. 3, the system 100 is a multiple server environment, designed to support online transaction processing, or other distributed transaction processing. In one embodiment, the system 100 includes one or more index servers 24 coupled to one or more database servers 22 and to one or more search servers 20. While the exemplary embodiment of the present invention is described as including multiple index servers 24, database servers 22, and search servers 20, it will be appreciated by those skilled in the art that the system 100 may include any number of such servers in any type of configuration.

As illustrated in FIG. 3, in one embodiment, the system 100 includes one through n index servers 24, where n is the maximum number of index servers that can be physically accommodated according to the specific transaction processing application. Each index server 24 indexes data used in the transaction processing application, as described in further detail below. Multiple index servers 24 allow for parceling of data and processing data in smaller index batches, enabling faster indexing times. If multiple index servers 24 are used within the system 100, a logical parceling of data according to one of many known logical parceling algorithms is necessary to ensure data integrity across multiple sets of data.

Each index server 24 is a conventional computer server, for example a Sun Blade computer server available from Sun Microsystems, Inc. of Palo Alto, Calif. Each index server 24 embodies a general-purpose computer or a network device, such as a network router, switch, bridge, gateway, or other like network device to perform the operations described herein. Each index server 24 further includes a processing device 110 and a storage device 115 coupled to the processing device 110.

Each processing device 110 is a programmable hardware and/or software module to perform the operations described herein. In one embodiment, each processing device 110 is a high-speed processor, which accommodates high processing requirements for the corresponding index server 24. Alternatively, each processing device 110 may be any type of processor configured to perform the operations described herein.

Each storage device 115 is a programmable hardware and/or software module to perform the operations described herein. In one embodiment, each storage device 115 is a high-speed data storage device, for example a solid-state disk (SSD). Alternatively, each storage device 115 may be a lower performance data storage device, for example a redundant array of inexpensive disks (RAID). Data is stored in the storage device 115 according to one of many known data storage methods.

As illustrated in FIG. 3, in one embodiment, the system 100 further includes one through p database servers 22, where p is the maximum number of database servers that can be physically accommodated according to the specific transaction processing application. Each database server 22 stores data used in the transaction processing application as described in further detail below.

Each database server 22 is a conventional computer server, for example a Sun Enterprise 4500 computer server, available from Sun Microsystems, Inc. of Palo Alto, Calif. Each database server 22 embodies a general-purpose computer or a network device, such as a network router, switch, bridge, gateway, or other like network device to perform the operations described herein. Each database server 22 further includes one or multiple central processing units (CPUs) (not shown), one or multiple processing devices (not shown), for example processors, and a memory device (not shown), preferably of a large capacity.

In one embodiment, each database server 22 runs a conventional database management system for high-speed, high-performance enterprise level transaction data processing system, for example a data processing system available from Oracle Corporation, of Redwood Shores, Calif. Each database server 22 stores a portion of the data necessary for the transaction data processing application. Considering an environment where an electronic marketplace or exchange operates, one database server 22 may store information related to some products offered for trade, for example books, while another database server 22 may store information related to other products or services offered for sale, such as available celebrity memorabilia, and still another database server 22 may store information related to different products or services, for example antique furniture. The information related to each of these divisions of data may include an item number of each product item or service item, a description of the item, a title of the item, and other identifying information for each item that may need to be searched. This identifying information may include, for example, information about a seller of each item, provenance information of certain items, and other identifying information according to the specific requirements of the online transaction processing application.

As illustrated in FIG. 3, in one embodiment, the system 100 further includes one through m search servers 20, where m is the maximum number of search servers that can be physically accommodated according to the specific transaction processing application. Each search server 20 processes search requests from users. For example, in an online electronic marketplace environment, a particular purchaser may be looking for a particular item that is identified by a specific index or combination of indices and may use a search server 20 to locate that item.

Each search server 20 is a conventional computer server, for example a system enterprise class 4500 computer server, available from Sun Microsystems, Inc. of Palo Alto, Calif. Each search server 20 embodies a general-purpose computer or a network device, such as a network router, switch, bridge, gateway, or other like network device to perform the operations described herein. Each search server 20 further includes one or multiple central processing units (CPUs) (not shown), one or multiple processing devices (not shown), for example processors, and a memory device (not shown), preferably of a large capacity.

In one embodiment, each search server 20 is physically distributed across a network, such as, for example, the Internet. Alternatively, each search server 20 may be distributed across other types of networks, such as a LAN, WAN, or wireless network. In one embodiment, search servers 20 can be geographically distributed to accommodate the searching needs of users in different geographical regions.

In an alternate embodiment, instead of the one through m search servers 20, the system may include multiple listing servers 16, for example m listing servers 16, where m is the maximum number of listing servers that can be physically accommodated according to the specific transaction processing application. Each listing server 16 processes listing requests from users and provides listings of items to the users. For example, in an online electronic marketplace environment, a particular purchaser may be looking for a particular listing containing an item that is identified by a specific index or combination of indices and may use a listing server 16 to locate the listings containing that item.

Each listing server 16 is a conventional computer server, for example a system enterprise class 4500 computer server, available from Sun Microsystems, Inc. of Palo Alto, Calif. Each listing server 16 embodies a general-purpose computer or a network device, such as a network router, switch, bridge, gateway, or other like network device to perform the operations described herein. Each listing server 16 further includes one or multiple central processing units (CPUs) (not shown), one or multiple processing devices (not shown), for example processors, and a memory device (not shown), preferably of a large capacity. Although the description below refers to search servers 20 and to systems and methods to perform data indexing using one or more search servers 20, it is to be understood that listing servers 16 may be substituted for the search servers 20 without departing from the broader spirit and scope of the invention.

In one embodiment, users of the system 100 within the facility 10 continuously enter data related to an online or otherwise distributed transaction processing application into one or more database servers 22, according to logical dividing or binning of the total necessary information for each item and the logical division of sets of information. Alternatively, users may enter data into a respective database server 22 during certain predetermined periods of time.

In one embodiment, each index server 24 periodically extracts new data from the database servers 22. Prior to each extraction of data, the processing device 110 within each index server 24 duplicates a database residing in the storage device 115 to obtain a duplicated database and stores the duplicated database in the storage device 115. The duplication is performed to ensure data integrity and insure against performance degradation due to any potential corruption or other data-related problem. The storage device 115 will now contain two identical versions of the initial database.

In order to extract the newly entered data from the database servers 22, the processing device 110 within each index server 24 performs multiple database queries using one of many known database querying languages, such as, for example, a structured query language (SQL). Subsequent to the extraction of data from the database servers 22, the respective processing device 110 updates the database with the extracted data to obtain an updated database and stores the updated database in the storage device 115. After the update, the storage device 115 contains the updated database containing the updated data and the duplicated database.

In one embodiment, the processing device 110 within each index server 24 re-indexes the updated database, and further re-normalizes the database to optimize it for subsequent searching operations. The respective processing device 110 indexes the updated database using one of many known indexing methods and further formats the updated-database using a predetermined conventional optimization algorithm.

In one embodiment, the processing device 110 within each index server 24 further transmits or distributes the newly re-indexed and renormalized data within the updated database to the search servers 20. Alternatively, each search server 20 may receive only a portion of the re-indexed and renormalized data from each index server 24. At the same time, the processing device 110 within each index server 24 further provides a pointer to each search server 20 to reference the updated database for the respective search server 20.

In an alternate embodiment, the processing device 110 further transmits the newly re-indexed and renormalized data to a master search server 20 of the multiple search servers 20 shown in FIG. 3. The master search server 20 updates its database with the newly re-indexed and renormalized data and communicates with the remaining search servers 20 to signal that an updated database is available for retrieval. In one embodiment, the remaining search servers 20 sequentially retrieve the new data from the master search server 20 and update their corresponding databases. Alternatively, the remaining search servers 20 may update corresponding databases according to a predetermined scheme, wherein a predetermined number of search servers 20 simultaneously take themselves out of service in order to update the databases with the new data.

In another alternate embodiment, subsequent to the extraction of data from the database servers 22, the respective processing device 110 updates the database with the extracted data to obtain an updated database, re-indexes and re-normalizes the updated database, and stores the updated database in a common storage device (not shown) coupled to each index server 24 and to each search server 20. The common storage device is a programmable hardware and/or software module to perform the operations described herein. In one embodiment, the common storage system is a high-speed data storage device, for example a solid-state disk (SSD). Alternatively, the common storage device may be a lower performance data storage device, for example a redundant array of inexpensive disks (RAID). Data is stored in the common storage device according to one of many known data storage methods.

Subsequent to indexing and normalization, the processing device 110 signals to each search server 20 that an updated database is available in the common storage device and allows the search servers 20 to update their respective databases. In one embodiment, search servers 20 sequentially retrieve the new data from the common storage device and update their corresponding databases. Alternatively, the remaining search servers 20 may update corresponding databases according to a predetermined scheme, wherein a predetermined number of search servers 20 simultaneously take themselves out of service in order to update the databases with the new data.

In one embodiment, index servers 24, database servers 22, and search servers 20 are optimized to insert and update information quickly while at the same time still servicing user requests in a timely fashion. Although any conventional computer server can be used for any of the three different server functions of the embodiments described herein, different parameters and characteristics of a conventional server optimize the function of each type of server differently. For example, each search server 20 may require a large memory, but may not require extremely rapid or powerful CPU processing; each index server 24 may require high CPU performance and rapid storage, but not a large amount of storage; and each database server 22 may require both a large memory and powerful CPU performance to maintain optimal performance of the system 100.

Figure 4:
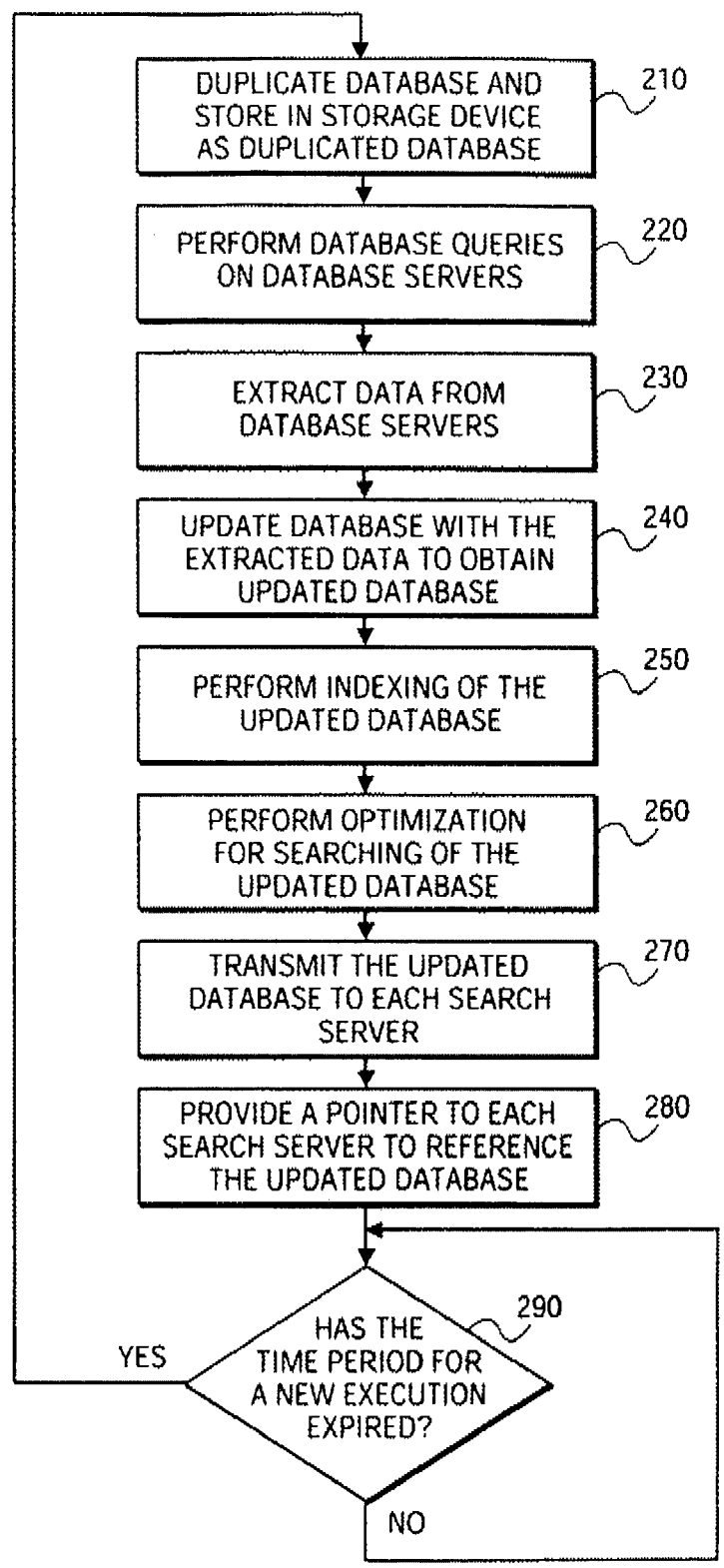
FIG. 4 is a flow diagram of one embodiment of a method to perform data indexing within the Internet-based auction facility.

FIG. 4 is a flow diagram of one embodiment of a method to perform data indexing within the Internet-based auction facility. According to FIG. 4, at processing block 210, a database is duplicated and stored in the storage device as a duplicated database. In one embodiment, the respective index server 24 duplicates the current database and stored the duplicated database in the storage device 115.

At processing block 220, multiple database queries are performed on the database servers 22. In one embodiment, the respective index server 24 performs the database queries using a predetermined conventional database querying language, for example the structured query language (SQL), to extract data from the database servers 22.

At processing block 230, data is extracted from the database servers 22. In one embodiment, the respective index server 24 extracts newly modified data from the database servers 22.

At processing block 240, the database is updated with the extracted data to obtain an updated database. In one embodiment, the respective index server 24 updates the database stored in the storage device 115 with the extracted data and stores the updated database in the storage device 115.

At processing block 250, indexing is performed on the updated database. In one embodiment, the index server 24 re-indexes and renormalizes the newly updated database using one of many known indexing methods. At the completion of processing block 250, the storage device 115 stores the duplicated database containing the fully indexed data from the last update period, and the updated database that contains the fully indexed recently extracted data.

At processing block 260, optimization is performed on the updated database. In one embodiment, in order to optimize the updated database for text-based searching, the index server 24 formats the updated database using predetermined conventional optimization methods to optimize the searching process, for example an optimization method that organizes data in an inverted B-tree of word results that allows for text-based searching on all of the data. It is to be understood that any conventional method of optimizing large quantities of data for searching can be used, according to the specifications for the online or otherwise distributed transaction processing application.

At processing block 270, the updated database is transmitted to each search server 20. In one embodiment, the index server 24 copies the re-indexed and optimized database to all of the available search servers 20. Alternatively, the index server 24 copies the re-indexed and optimized database to a master search server 20 of the multiple search servers 20. Subsequently, the master search server 20 instructs the remaining search servers 20 to update their corresponding databases sequentially or according to a predetermined scheme. In another alternate embodiment, the index server 24 copies the re-indexed and optimized database to a common storage device coupled to each search server 20. Then, the index server 24 signals to each search server 20 that an updated database is available in the common storage device and allows the search servers 20 to update their respective databases.

At processing block 280, a pointer is provided to each search server 20 to reference the updated database. In one embodiment, the index server 24 provides each search server 20 with a pointer to the updated database on the respective search server 20. Alternatively, providing the pointer may include accommodating any load-balancing algorithms that are used, according to the specifications of the online or otherwise distributed transaction processing application. In one embodiment, if the index server 24 determines that data corruption or other error has occurred with the updated database, the index server 24 may point each search server 20 to the duplicated database instead of the updated database.

Finally, at processing block 290, a decision is made whether the time period for execution of a new indexing operation has expired. If the time period has expired, processing blocks 210 through 290 are repeated. Otherwise, if the time period has not expired, processing block 290 is repeated.

Because the method illustrated in FIG. 4 is executed continually, there is an assumption that each database server 22 has already been populated and that the respective index server 24 has initially taken a copy of the stored data from the database servers 22 and has stored it in the storage device 115 located on the index server 24, and that the index server 24 has transmitted or pushed the copied information onto each search server 20. The periodicity of the full execution of the indexing method is determined by a system designer in accordance with the needs of the online electronic marketplace environment, for example more or less frequently or on an ad hoc basis according to application specifications.

Figure 5:
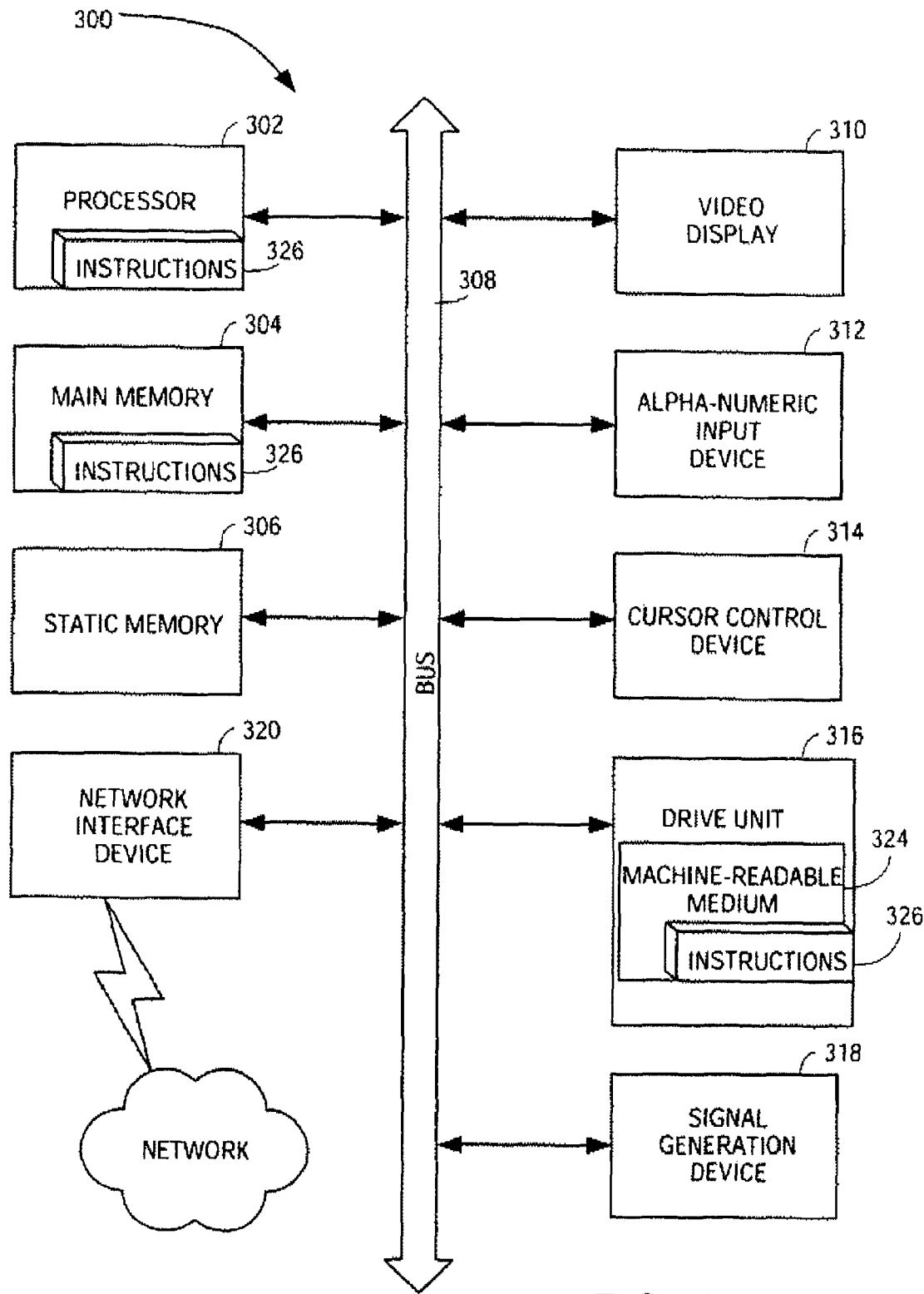
FIG. 5 is a diagrammatic representation of a machine in the exemplary form of a computer system within which a set of instructions may be executed.

FIG. 5 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 18 (e.g., a speaker), and a network interface device 320.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320.

Figure 6:
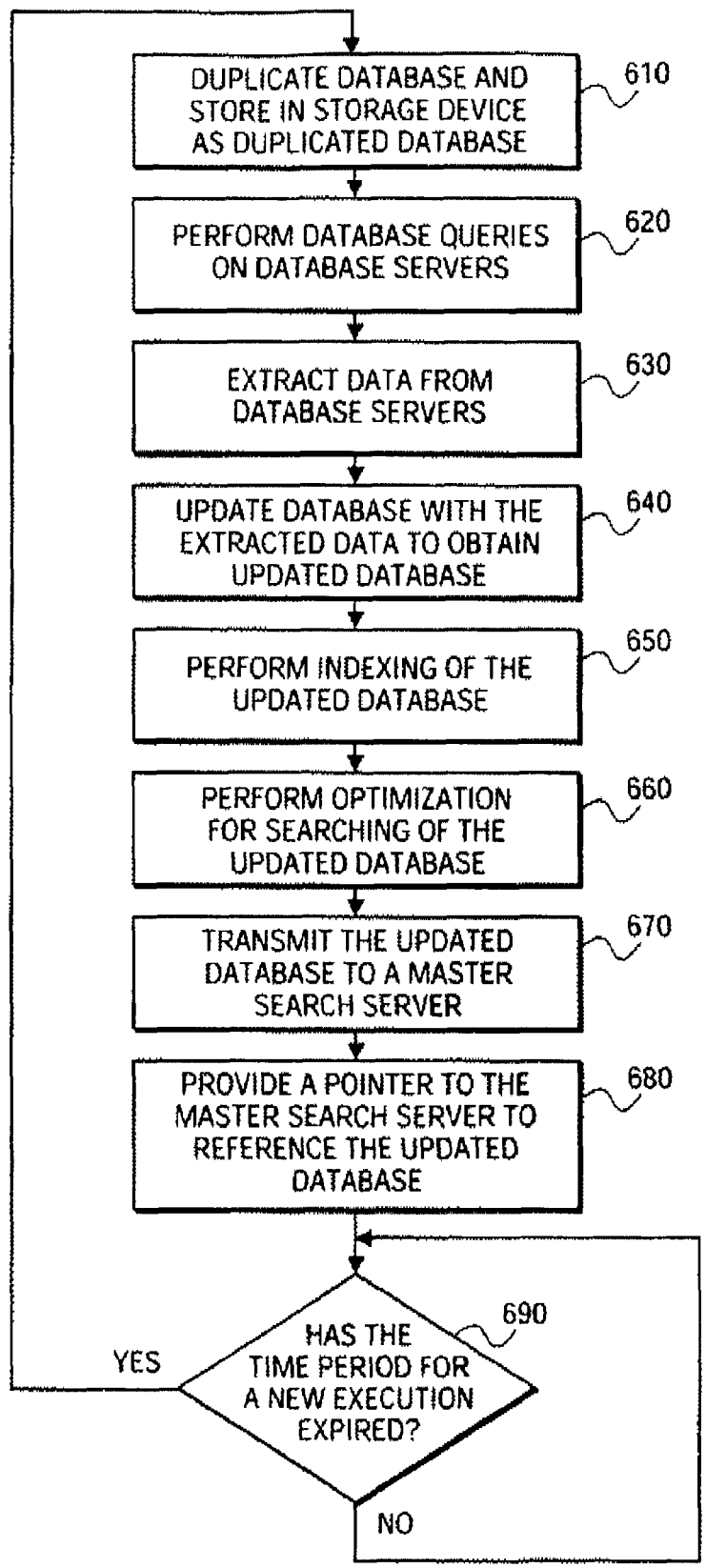
FIG. 6 is a flow diagram of an alternate embodiment of the method to perform data indexing within the Internet-based auction facility.

FIG. 6 is a flow diagram of an alternate embodiment of the method to perform data indexing within the Internet-based auction facility. As illustrated in FIG. 6, processing blocks 610 through 660 are similar to processing blocks 210 through 260 described in detail in connection with FIG. 4.

In one embodiment, at processing block 670, the updated database is transmitted to a master search server 20 of the multiple search servers 20. At processing block 680, a pointer is provided to the master search server 20 to reference the updated database on the respective master search server 20. Alternatively, providing the pointer may include accommodating any load-balancing algorithms that are used, according to the specifications of the online, or otherwise distributed, transaction processing application.

Finally, at processing block 690, a decision is made whether the time period for execution of a new indexing operation has expired. If the time period has expired, processing blocks 610 through 690 are repeated. Otherwise, if the time period has not expired, processing block 690 is repeated.

Figure 7:
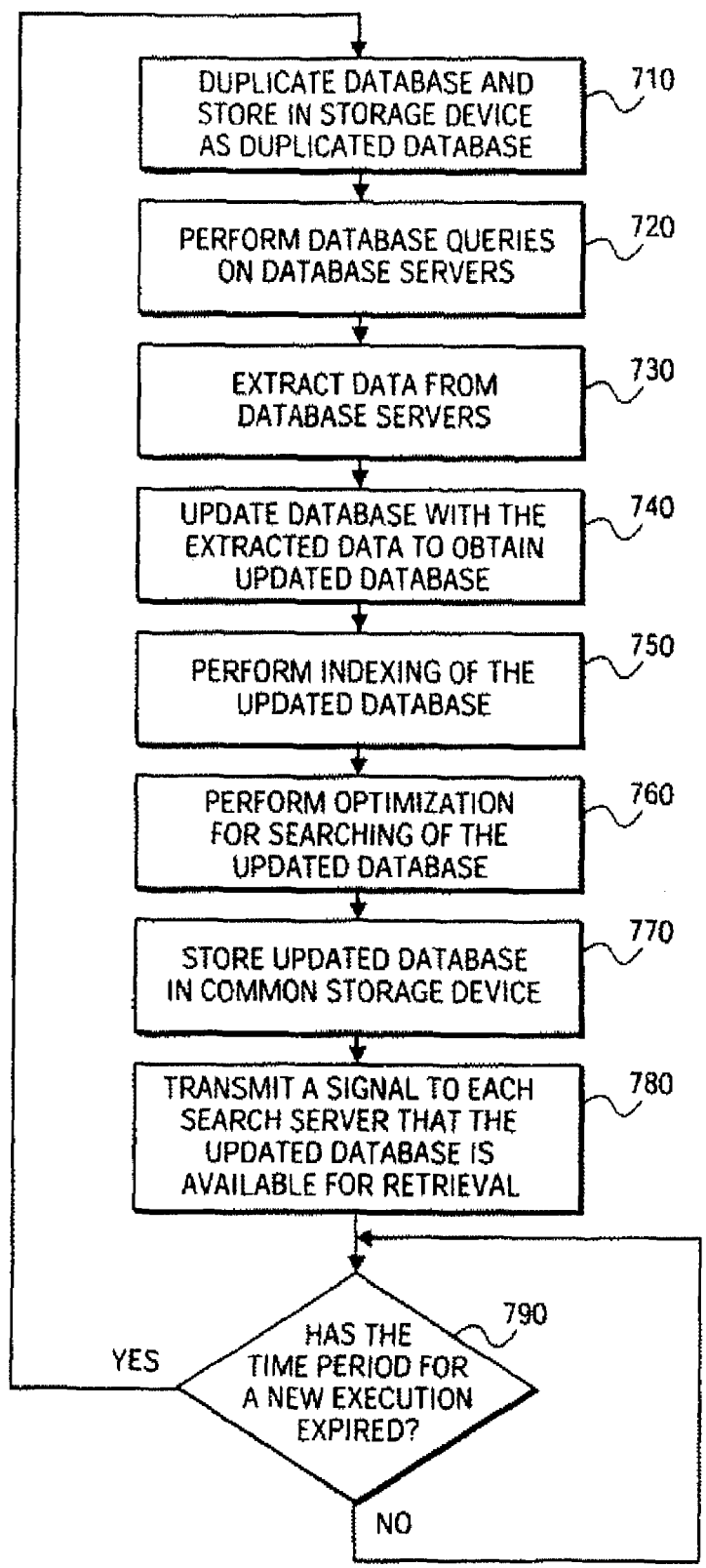
FIG. 7 is a flow diagram of another alternate embodiment of the method to perform data indexing within the Internet-based auction facility.

FIG. 7 is a flow diagram of another alternate embodiment of the method to perform data indexing within the Internet-based auction facility. As illustrated in FIG. 7, processing blocks 710 through 760 are similar to processing blocks 210 through 260 described in detail in connection with FIG. 4.

In one embodiment, at processing block 770, the updated database is copied and stored in a common storage device coupled to each search server 20 and to each index server 24. At processing block 780, a signal is transmitted to each search server 20 that an updated database is available for retrieval in the common storage device. This allows the search servers 20 to connect to the common storage device to update their respective databases.

Finally, at processing block 790, a decision is made whether the time period for execution of a new indexing operation has expired. If the time period has expired, processing blocks 710 through 790 are repeated. Otherwise, if the time period has not expired, processing block 790 is repeated.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information. While embodiments of the present invention will be described with reference to the Internet and the World Wide Web, the system and method described herein is equally applicable to other network infrastructures or other data communication systems.

In the foregoing specification, the invention has been described with reference to specific exemplary embodiments thereof. It will, however, be evident that various modifications and changes may be made thereto without departing from the broader spirit and scope of the invention as set forth in appended claims. The specification and drawings are, accordingly, to be regarded in an illustrative rather than a restrictive sense.

What is claimed is:

1. A method for indexing data in a transaction processing environment, the method including:
    periodically extracting data, by a computer system, from at least one database server;
    duplicating, by said computer system, a source database to obtain a duplicated database;
    storing said duplicated database in a storage device, wherein said storage device is associated with an index server;
    after storing said duplicated database in said storage device, updating said source database stored in said storage device with said extracted data to obtain an updated database;
    re-indexing said updated database with said extracted data;
    re-optimizing said updated database for searching; and
    transmitting, by said computer system, said updated database after re-indexing and re-optimizing to at least one search server, wherein said at least one search server is different from said index server.

2. The method according to claim 1, further including:
    providing a pointer to said at least one search server, said pointer referencing said updated database for said at least one search server.

3. The method according to claim 1, wherein said extracting further comprises:
    performing a plurality of database queries on said at least one database server.

4. The method according to claim 3, wherein each database query of said plurality of database queries is performed using a predetermined database querying language.

5. The method according to claim 4, wherein said predetermined database querying language is a structured query language (SQL).

6. The method according to claim 1, wherein said re-optimizing further comprises:
    formatting said updated database using a predetermined optimization algorithm.

7. The method according to claim 1, wherein each of said at least one database server stores a portion of said data according to a predetermined logical division algorithm.

8. An apparatus for indexing data in a transaction processing environment, the apparatus including:
    a storage device to store a source database containing data related to a transaction processing application; and
    a processing device coupled to said storage device to duplicate said source database to obtain a duplicated database and store said duplicated database in said storage device, to periodically extract current data from at least one database server coupled to said processing device, to update said source database, after storing said duplicated database in said storage device, with said extracted current data to obtain an updated database, to re-index said updated database with said extracted current data, to re-optimize said updated database for searching, and to transmit said updated database after re-indexing and re-optimizing to at least one search server coupled to said processing device, wherein said at least one search server is different from said processing device.

9. The apparatus according to claim 8, wherein said processing device further provides a pointer to said at least one search server, said pointer referencing said updated database for said at least one search server.

10. The apparatus according to claim 8, wherein said processing device further performs a plurality of database queries on said at least one database server.

11. The apparatus according to claim 10, wherein each database query of said plurality of database queries is performed using a predetermined database querying language.

12. The apparatus according to claim 8, wherein said processing device further formats said updated database using a predetermined optimization algorithm in order to re-optimize said updated database.

13. A tangible computer readable medium containing executable instructions, which, when executed in a processing system, cause said processing system to:
    periodically extract data from at least one database server;
    duplicate a source database to obtain a duplicated database;
    store said duplicated database in said storage device, wherein said storage device is associated with an index server;
    after storing said duplicated database in said storage device, update said source database stored in said storage device with said extracted data to obtain an updated database;
    re-index said updated database with said extracted data;
    re-optimize said updated database for searching; and
    transmit said updated database after re-indexing and re-optimizing to at least one search server, wherein said at least one search server is different from said index server.

14. A system for indexing data in a transaction processing environment, said system including:
    at least one database server to store data related to a transaction processing application;
    at least one index server coupled to said at least one database server, each of said at least one index server associated with a storage device to store a first database containing a version of said data;
    a designated search server coupled to said at least one index server to receive an updated database from said at least one index server; and
    at least one search server coupled to said designated search server to receive said updated database;
    wherein said at least one index server is configured to:
    extract said data periodically from said at least one database server;
    duplicate said first database to obtain a duplicated database;
    store said duplicated database in said storage device;
    after storing said duplicated database in said storage device, update said first database with said extracted data to obtain said updated first database;
    re-index said updated first database with said extracted data;
    re-optimize said updated first database for searching; and
    transmit said updated first database after re-indexing and re-optimizing to said designated search server; and
    wherein said designated search server is configured to distribute said updated first database to said at least one search server on a periodic or regular schedule.

* * * * *